Sept. 15, 1925.

J. W. FRENCH 1,553,374

ELECTRICAL STEP-BY-STEP MOTOR SYSTEM

Filed Sept. 10, 1923  3 Sheets-Sheet 1

Inventor:—
James Weir French

By: Fowler and Smith,
Attorneys.

Sept. 15, 1925.

J. W. FRENCH 1,553,374

ELECTRICAL STEP-BY-STEP MOTOR SYSTEM

Filed Sept. 10, 1923    3 Sheets-Sheet 2

Inventor:—
James Weir French,
By:— Fowler and Smith
attorneys.

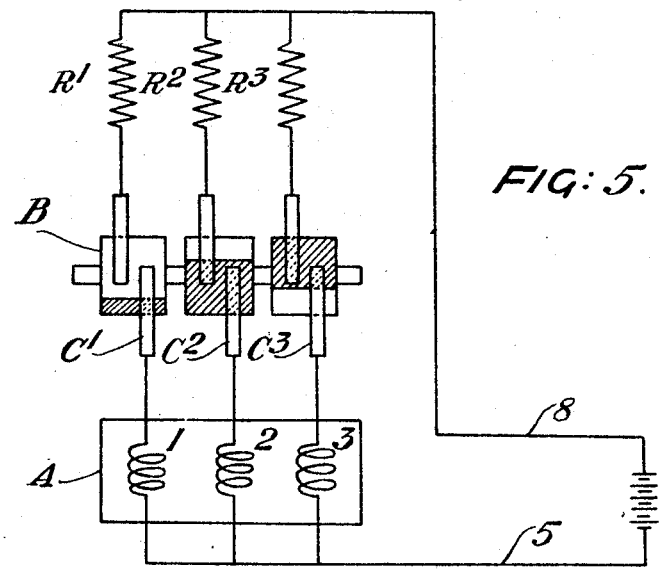
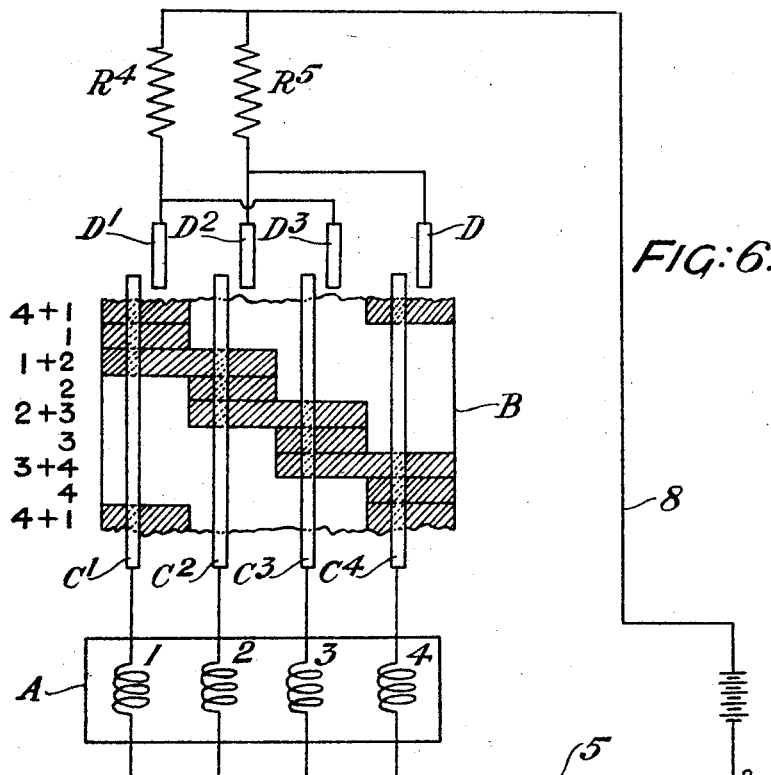

Patented Sept. 15, 1925.

1,553,374

UNITED STATES PATENT OFFICE.

JAMES WEIR FRENCH, OF GLASGOW, SCOTLAND, ASSIGNOR TO BARR AND STROUD, LIMITED, OF GLASGOW, SCOTLAND.

ELECTRICAL STEP-BY-STEP MOTOR SYSTEM.

Application filed September 10, 1923. Serial No. 661,895.

*To all whom it may concern:*

Be it known that I, JAMES WEIR FRENCH, a subject of the King of Great Britain and Ireland, and of Caxton Street, Anniesland, Glasgow, Scotland, have invented new and useful Improvements in Electrical Step-by-Step Motor Systems, of which the following is a specification.

This invention relates to improvements in electrical step-by-step motor systems for the indication of data such as gunnery data in which the supply of current is interrupted or varied between the indications, and particularly to step-by-step motor systems which have to indicate a large number of steps per second and in which the equivalent resistance or impedance of the system may be very considerably increased at high speeds as the result of self induction, particularly of the motor magnet coils.

One object of the invention is to prevent a serious reduction of the current passing through the motor coils as the speed of indication increases.

The invention comprises a system of resistance, having little or no self induction, hereinafter and in the claims referred to generally as being non-inductively wound, and means whereby the magnet coils of the motor may be brought into circuit with the source of supply and for causing each magnet coil while energized to be always in series with a constant resistance of the system.

Although the invention is applicable to step-by-step motors having three or more magnet coils and in which the individual steps are determined by the excitation of individual coils in a definite sequence or by the excitation of the coils singly or in groups in a definite sequence, or by a variation of the excitation of the coils which may all be energized simultaneously or in groups, for purposes of explanation, the invention will be described with particular reference to a step-by-step direct current motor having three or four magnet coils and with reference to the accompanying drawings, in which:—

Figure 5 is a diagram of a motor and transmitter electrical system with three resistance units in the line wires between the transmitter and the common supply wire.

Figure 6 is a diagram of four-coil motor and corresponding transmitter electrical system with two resistance units connected each to a pair of commutator contacts.

Figure 1:
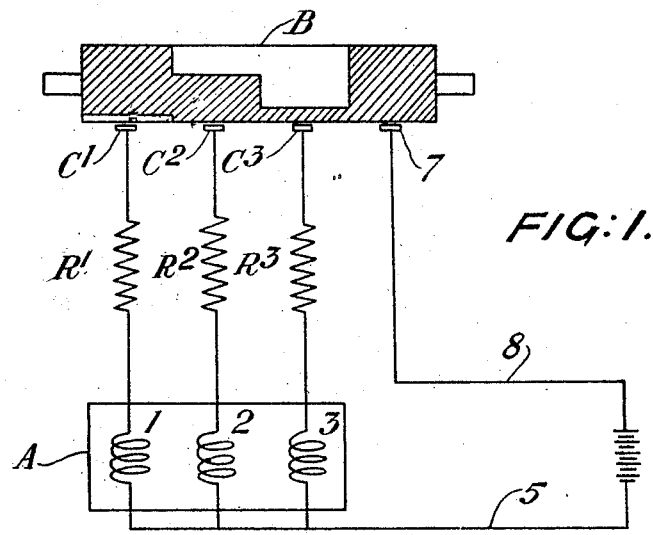
Figure 1 is a diagram of a motor and transmitter system with three resistance units in the line wires between the motor and transmitter.

In Figure 1, the motor A has three magnet coils 1, 2 and 3, which are interconnected at one end with one of the common wires 5 and are separately connected at the other ends to the contacts $C^1$, $C^2$ and $C^3$ of a commutator B and thence to the contact 7 and the other common wire 8 of a source of current at a voltage, say, for purposes of description, of 250 volts. Resistance units $R^1$, $R^2$ and $R^3$, non-inductively wound, are inserted between the contacts $C^1$, $C^2$ and $C^3$ and the corresponding coils 1, 2 and 3.

If it is desired that the current through each magnet coil shall not exceed, say, half an ampere, such that the receiver motor will not overheat under the conditions of use, each magnet coil may be wound with a resistance of, say, 40 ohms, making each line resistance 460 ohms, the total static resistance being thus 500 ohms and the current 0.5 ampere, when the transmitter commutator is at rest and the supply of current is not being interrupted. When, however, the transmitter is operated and the current is rapidly interrupted or varied in amount, the reactance of the magnet coils 1, 2 and 3, will increase as the result of self-induction and at speeds of 500 steps per second the reactance of each magnet coil may be considerably greater than its static resistance. Suppose for example that the reactance is 100 ohms. The effective resistance or impedance will be $$\sqrt{(460+40)^2 + 100^2} = 510 \text{ ohms},$$

and the current will be 0.49 ampere; that is, a drop of only 0.01 ampere, or 2%. The torque of the motor at the high speed will be accordingly reduced by approximately the same small percentage as compared with the torque at low speeds.

If, however, there are no resistance units $R^1$, $R^2$ and $R^3$ inserted between the transmitter and the motor, then in order that the current through a magnet coil having as before a resistance of 40 ohms may be half an ampere, the applied voltage must be 20 volts. Now, if the transmitter is operated and the current is rapidly interrupted or varied in amount to such an extent that the reactance is, as before, say, 100 ohms, the effective resistance or impedance of the system will then be $$\sqrt{100^2 + 40^2} = 107.7 \text{ ohms}$$

and the current will be 0.186 ampere; that is, when the motor is running at the high speed the current will drop to the extent of 63%, whereas in the previous arrangement in accordance with this invention the corresponding drop in current will only be 2%.

Figure 2:
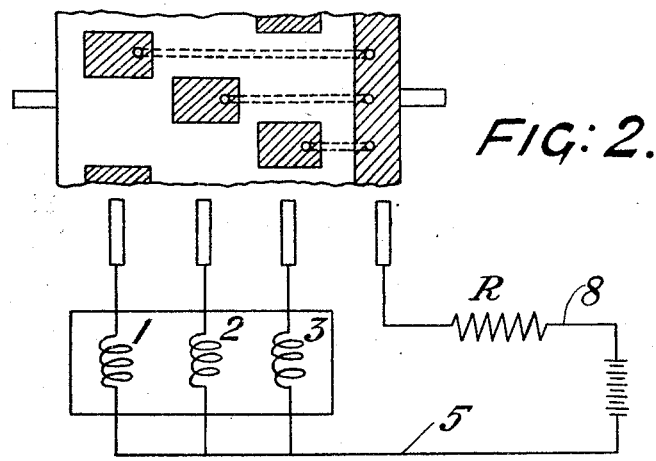
Figure 2 is a diagram of a motor and transmitter with a resistance unit in the common wire.

The resistance units may be inserted in series with the respective magnet coils or, when each motor step is determined by the excitation of one coil alone, as indicated in Figure 2, a resistance unit R may be inserted in one (or both) of the common wires, say, 8, instead of in the line wires, or the resistance system may be distributed over the line and the common wires. But it is frequently the case in such motors that the various steps are determined by the excitation in regular sequence of alternately one and two of the magnet coils.

The invention therefore will now be described with reference to a step-by-step motor of this latter type having three coils which are excited in the following regular sequence: (1), (1 and 2), (2), (2 and 3), (3), (3 and 1), (1) . . . . In association with a motor of this three circuit type, as in Figure 1, resistance units $R^1$, $R^2$ or $R^3$ may be inserted in each of the line wires. Under these circumstances the drop in current between the low and the high speeds will be only a small percentage amount. If the motor has four or more magnet coils a corresponding number of resistance units could be employed.

Figure 3:
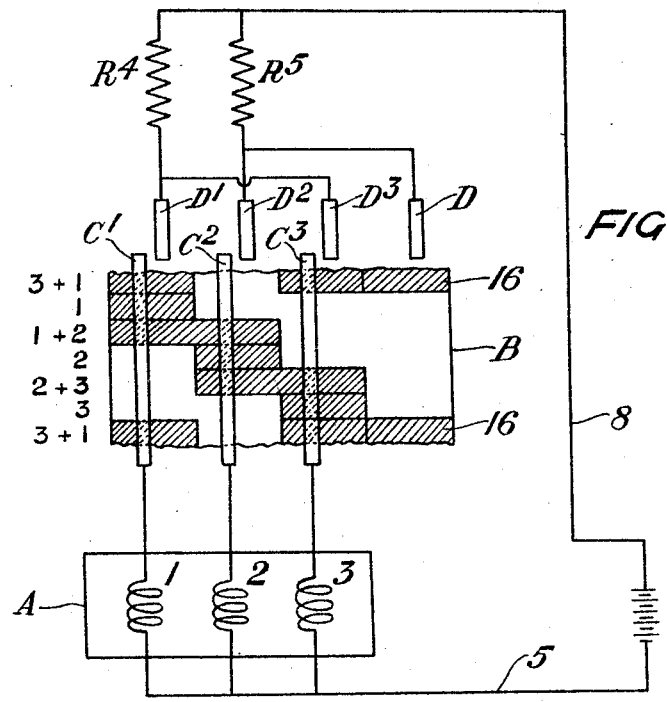
Figure 3 is a diagram of a motor and transmitter system embodying two resistance units and switch contacts.

In another arrangement illustrated in Figure 3, in the case of a motor having three magnet coils, two resistance units may be used, capable of being inserted in circuit with the coils as they are excited in sequence through the intermediary of the transmitter contacts. The magnet coils 1, 2 and 3 are connected respectively to transmitter contacts $C^1$, $C^2$ and $C^3$ and thence through appropriate transmitter contact segments to contact brushes $D^1$, $D^2$ and $D^3$ respectively. Resistance units $R^4$ and $R^5$, non-inductively wound are connected in series with the contacts respectively and the common wire 8. Contact $D^1$ is directly connected with contact $D^3$, and contact $D^2$ with a contact D associated with a commutator segment 16 of the transmitter commutator the segments of which are shown shaded. It will be seen that when any single magnet coil is excited one or other of the resistance units $R^4$ and $R^5$ is in series with the coil and that when any two coils are simultaneously excited, the resistance unit $R^4$ is in series with one of the coils and $R^5$ with the other.

Figure 4:
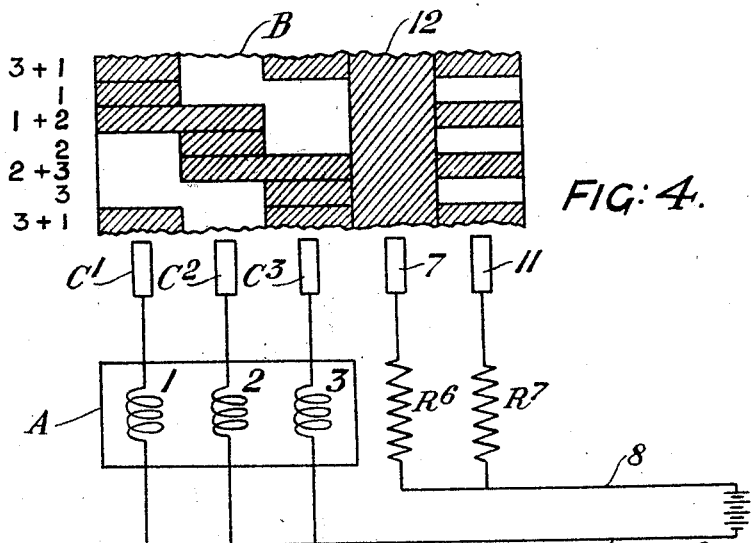
Figure 4 is a diagram of a motor and transmitter system with two resistance units in the common wire and means for switching one of them.

Again, for example, the arrangement indicated in Figure 4 may be adopted, in which a resistance unit $R^6$, non-inductively wound, is inserted between, say, the common wire 8 and the contact 7 and in which an additional similar resistance unit $R^7$ is inserted between the common wire 8 and a contact 11. The contact portions of the commutator B are shaded, the insulating portions being unshaded. As the commutator is displaced relatively to the contact brushes, it will be observed that coils 3 and 1 are excited, then coil (1), then (1 and 2), (2), (2 and 3), (3), (3 and 1) . . . . Projecting from the continuous commutator ring 12 towards the right hand there is indicated a series of contacts corresponding with the positions in which two coils are simultaneously excited. In such positions of the commutator the current passes through both resistance units $R^6$ and $R^7$. In the intermediate positions, when one coil is alone excited, the current passes through the resistance unit $R^6$. The percentage drop in the current passing through the motor is accordingly the same in the two cases, its value being only about 2% when the resistance and other conditions are as previously described.

Although in Figure 1 the resistance units $R^1$, $R^2$ and $R^3$ are shown inserted in the line wires between the respective coils 1, 2 and 3, and their corresponding transmitter contacts $C^1$, $C^2$ and $C^3$, the commutator, resistance system, and motor may be arranged in other ways. For example, as in Figure 5, the commutator B may be inserted between the motor A and the resistance units $R^1$, $R^2$ and $R^3$.

As previously stated, the invention is also applicable to step-by-step motor systems, the motors of which have more than three magnetic circuits excited in various combinations or ways.

For purposes of illustration it will suffice to describe the manner in which one example of the three coil motor system, say that described and illustrated with reference to Figure 3, may be modified to suit the case in which the step-by-step motor has four coils instead of three.

As indicated in Figure 6, the commutator may be extended by providing suitable segments in association with the fourth coil 4 and its contact brush $C^4$. The two resistance units $R^4$ and $R^5$ and the contacts $D^1$, $D^2$, $D^3$ and $D$ will be as in Figure 3. With this arrangement of parts it will be seen that one or other of the resistance units is in series with any single coil that may be excited and that when any pair of coils is excited the two resistance units are in series one with each coil of the pair.

I claim:—

1. An electrical step-by-step motor comprising more than two magnetic circuits, a system of resistance non-inductively wound, and means whereby the magnet coils of the motor may be brought into circuit with the source of supply and for causing each magnet coil while energized to be always in series with a constant resistance of the system.

2. An electrical step-by-step motor comprising more than two magnetic circuits, a system of resistance non-inductively wound, and a commutator device whereby the magnet coils of the motor may be brought into circuit with the source of supply and each magnet coil while energized caused to be always in series with a constant resistance of the system.

3. An electrical step-by-step motor comprising more than two magnetic circuits, a system of resistance non-inductively wound, the system of resistance comprising more than one resistance unit, and means whereby the magnet coils of the motor may be brought into circuit with the source of supply and for causing each magnet coil while energized to be always in series with one resistance unit and one unit only of the resistance system.

4. An electrical step-by-step motor comprising more than two magnetic circuits, each magnetic circuit having a magnet coil, a system of resistance non-inductively wound, the system of resistance comprising more than one resistance, one unit for each magnet coil, and means whereby the magnet coils may be brought into circuit with the source of supply and for causing each magnet coil while energized to be always in series with its resistance unit and that unit only of the resistance system.

5. An electrical step-by-step motor comprising more than two magnetic circuits, each magnetic circuit having a magnet coil, a system of resistance non-inductively wound, the system of resistance comprising more than one resistance, one unit for each magnet coil, and a commutator device having line wires one for each magnet coil in which the resistance units are situated one in each line wire, and by which commutator device the magnet coils may be brought into circuit with the source of supply and each magnet coil while energized caused to be always in series with its resistance unit and that unit only of the resistance system.

6. An electrical step-by-step motor comprising more than two magnetic circuits, each magnetic circuit having a magnet coil, a system of resistance non-inductively wound, the system of resistance comprising more than one resistance, one unit for each magnet coil, and a commutator device having line wires one for each magnet coil in which the resistance units are situated one in each line wire, the resistance units being between the magnet coils and the commutator device, and by which commutator device the magnet coils may be brought into circuit with the source of supply and each magnet coil while energized caused to be always in series with its resistance unit and that unit only of the resistance system.

JAMES WEIR FRENCH.